United States Patent
Joo

(10) Patent No.: US 6,243,342 B1
(45) Date of Patent: Jun. 5, 2001

(54) METHOD AND APPARATUS FOR CONTROLLING OPTICAL OUTPUT OF LASER DIODE

(75) Inventor: Seong-Sin Joo, Suwon-shi (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/131,696

(22) Filed: Aug. 10, 1998

(30) Foreign Application Priority Data

Aug. 12, 1997 (KR) .................................................. 97-38439

(51) Int. Cl.[7] ......................................................... G11B 3/90
(52) U.S. Cl. ......................................... 369/53.26; 369/116
(58) Field of Search .................................. 369/54, 58, 116, 369/44.26, 44.27, 44.29, 44.35, 44.36, 47, 48, 50, 124.15, 47.36, 47.49, 47.5, 47.51, 47.52, 47.53, 47.55, 53.25, 53.26, 53.27, 53.37

(56) References Cited

U.S. PATENT DOCUMENTS 5,042,022 * 8/1991 Ogawa ................................ 369/54 X
5,548,573 * 8/1996 Takeuchi ............................... 369/116

* cited by examiner

*Primary Examiner*—Paul W. Huber
(74) *Attorney, Agent, or Firm*—Staas & Halsey LLP

(57) ABSTRACT

A method and apparatus for controlling an optical output of a laser diode. Writing or erasing optical outputs of a laser diode are controlled during a mirror region interval of a header within an optical disk, under a continuous optical output state of the laser diode. A change in the optical output caused by heat of the laser diode is compensated by comparing the writing and erasing optical outputs with corresponding preset writing and erasing optical output values.

24 Claims, 3 Drawing Sheets

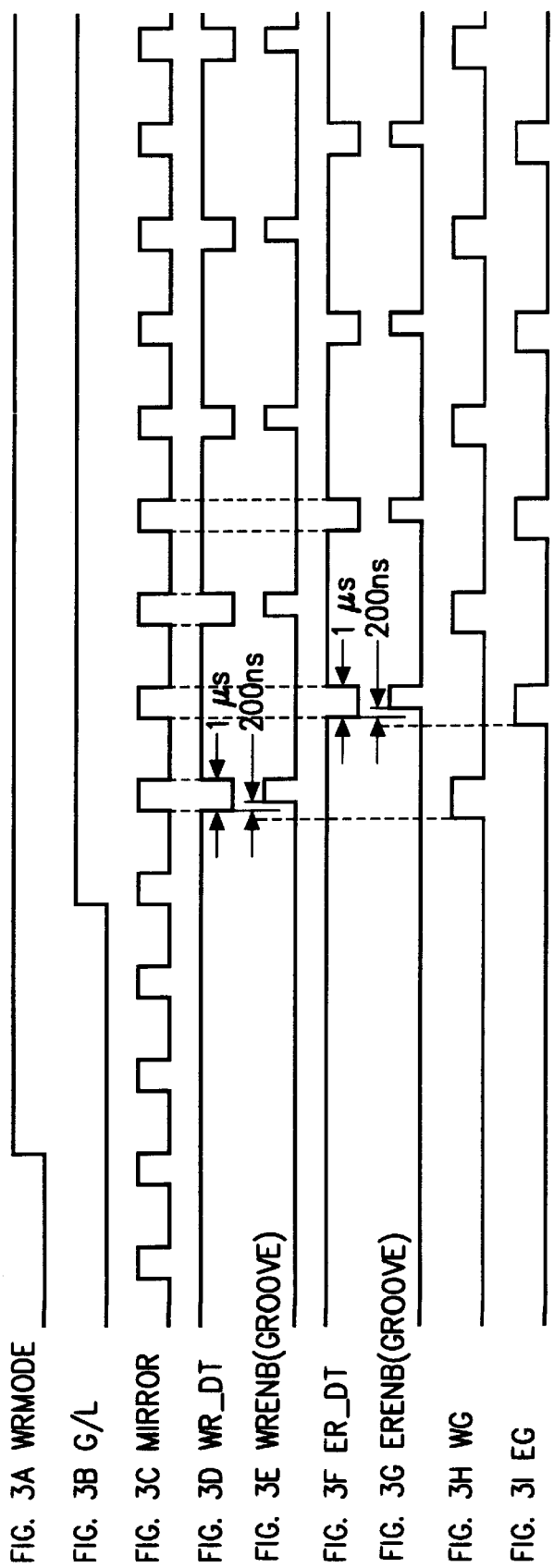

METHOD AND APPARATUS FOR CONTROLLING OPTICAL OUTPUT OF LASER DIODE

CROSS-REFERENCE TO RELATED APPLICATION

This application claims the benefit of Korean Application No. 38439/1997, filed Aug. 12, 1997, in the Korean Industrial Property Office, the disclosure of which is incorporated herein by reference.

BACKGROUND OF THE INVENTION

1. Field of the Invention

The present invention relates to an optical disk system, and more particularly, to a method and apparatus for controlling an optical output by using a laser diode.

2. Description of the Related Art

In an optical recording/reproducing technique for recording and reproducing data on an optical disk by using a laser, the data is read out by a change in light reflected from the disk. In order to change the reflected light, that is, to record the data on the disk, a compact disk (CD) or a digital video disk (DVD) utilizes the interference between a pit curved inwards from a substrate and a reference surface. A magneto-optical disk uses a method for changing the direction of polarized light of a magneto-optical recording material. Moreover, a phase-change type disk uses a difference between the quantities of reflected light according to the state of a recording material. A CD-recordable (CD-R) disk utilizes a change in an organic pigment. Each disk is classified into a read-only type, a write-once type and an overwritable type. In an optical disk system using such an optical disk, an optical pickup is an essential component to record or reproduce data on the optical disk by controlling an optical output.

FIG. 1 illustrates a conventional laser diode optical output controlling apparatus. The apparatus of FIG. 1 includes a register controller 2, a digital-to-analog (D/A) converter 4, a current driver 6, a laser diode 8, a photo diode 10, and a current-to-voltage (I/V) converter 12.

An optical pickup designer selects digital values suitable for reproducing and recording optical outputs in consideration of the characteristics of the laser diode 8. The digital values are stored in respective registers within the register controller 2. The digital value of the reproducing or recording optical output stored in one of the registers within the register controller 2 is converted into an analog current value by the D/A converter 4, and the analog current value is applied to the current driver 6. The current driver 6 drives the laser diode 8 according to the analog current value. Namely, the current driver 6 amplifies the applied current value to supply reproducing or recording current of a desired value to the laser diode 8. Then the laser diode 8 irradiates a laser beam onto an optical disk (not shown) at a predetermined reproducing/recording optical output level. The laser beam is also irradiated to the monitoring photo diode 10, which is opposite to the laser diode 8. The current of the optical output received by the photo diode 10 is converted into a voltage by the I/V converter 12, and the converted voltage is applied to the register controller 2. The register controller 2 calculates an accurate value by comparing the reproducing or recording optical output with the irradiated optical output only once and stores the calculated value in the register. That is, the accurate value is set by comparing the optical output applied from the I/V converter 12 with the optical output stored in the register only once, and the accurate value is again stored in the register. Thus, the actual optical output of the laser diode 8 is controlled by using the stored value only.

However, during continuous recording, the laser diode generates heat. Therefore, even if constant current is supplied to the laser diode by the register in which a desired value is stored, the efficiency of the optical output of the laser diode is lowered and the optical output of the desired amount is not irradiated. Therefore, sufficient light is not supplied to regions of the disk, and data may be not recorded. Even though data is recorded, the data may not be recorded accurately. Consequently, a carrier-to-noise (C/N) ratio is lowered and the reliability of the recording/reproducing optical disk system is degraded.

SUMMARY OF THE INVENTION

It is an object of the present invention to provide an optical output controlling method and apparatus for improving the performance of a recording/reproducing optical disk system even during continuous optical outputs of a laser diode.

It is another object of the present invention to provide an optical output controlling method and apparatus for maintaining an optical output of a constant quantity, so that a constant optical output of the laser diode which is initially set is continuously maintained.

Additional objects and advantages of the invention will be set forth in part in the description which follows, and, in part, will be obvious from the description, or may be learned by practice of the invention.

According to an aspect of the present invention, to achieve the above and other objects of the present invention, a writing or erasing optical output of a laser diode are controlled during a mirror region interval of a header within an optical disk, under a continuous optical output state of the laser diode. A change in an optical output caused by heat of the laser diode is compensated by comparing the writing or erasing optical output with a corresponding preset writing and erasing optical output value.

BRIEF DESCRIPTION OF THE DRAWINGS

The above and other objects, features and advantages of the present invention will become more apparent from the following detailed description when taken in conjunction with the accompanying drawings, of which:

FIGS. 3A through 3I are waveforms showing signals at each portion of the apparatus of FIG. 2.

DETAILED DESCRIPTION OF THE PREFERRED EMBODIMENT

Figure 1:
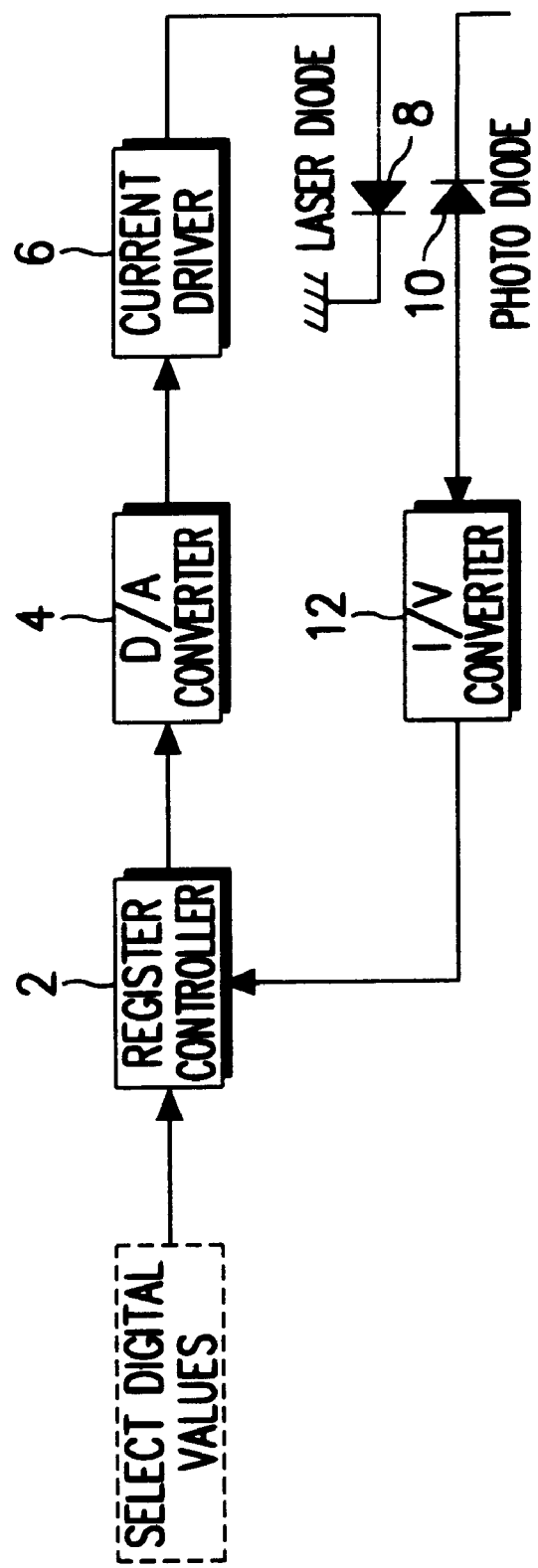
FIG. 1 is a block diagram showing a conventional laser diode optical output controlling apparatus.

Reference will now be made in detail to the present preferred embodiment of the present invention, examples of which are illustrated in the accompanying drawings, wherein like reference numerals refer to like elements throughout. In the following description, well known functions and constructions which may obscure the present invention are not described in detail.

Figure 2:
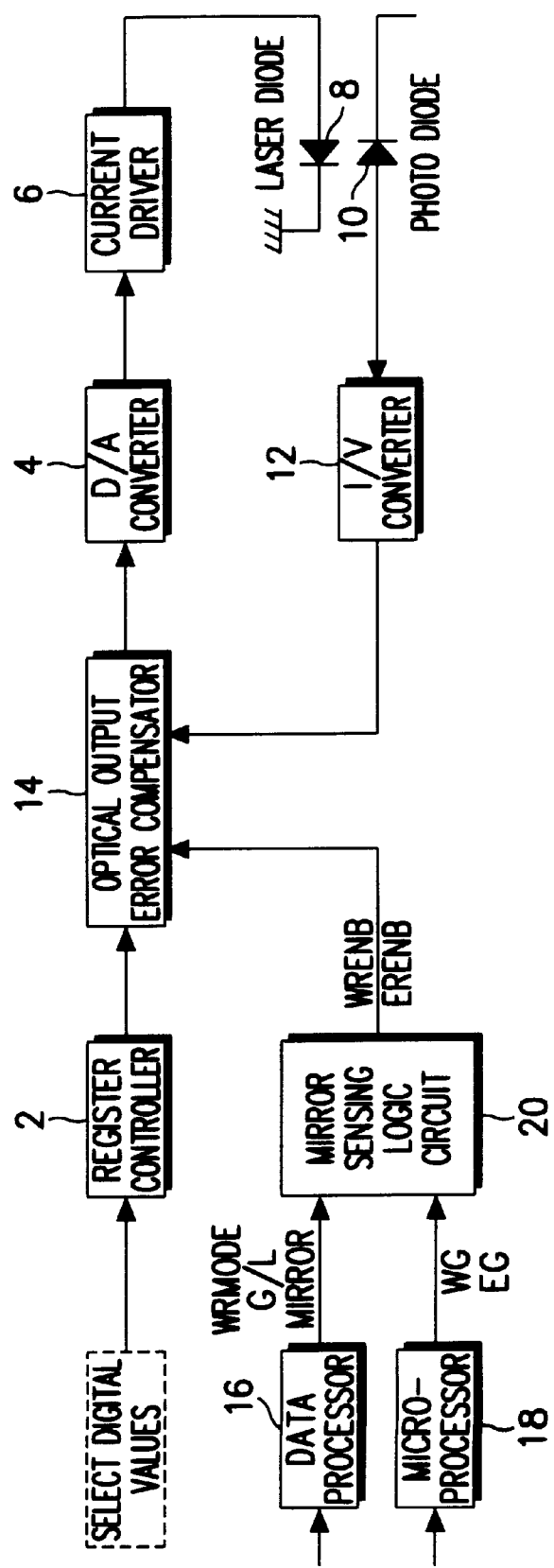
FIG. 2 is a block diagram showing a laser diode optical output controlling apparatus according to an embodiment of the present invention.

FIG. 2 shows a laser diode optical output controlling apparatus. A laser diode 8 generates a light beam (optical output). If the laser diode 8 generates heat by generating continuous optical outputs, the optical output of the laser diode 8 is changed. The changed optical output of the laser diode 8 is controlled by using a mirror region of a header defined on an optical disk (not shown). Especially, to control the optical output for writing and erasing data, the mirror region of the header of the optical disk is used. The mirror region of the header is situated at an end of the header positioned in each sector and has no information. The mirror region of the header has the highest reflectance within the optical disk, and has been used to measure the reflectance of the optical disk. In a preferred embodiment of the present invention, it is used to control the optical output.

To reproduce data, the optical output is controlled irrespective of any regions of the optical disk since data is not damaged or altered in an unintended manner. However, to write and erase data, the optical output is controlled only during a mirror region interval (about 1 μs) of the header since recorded data may otherwise be damaged or altered. According to the embodiment of the present invention, even if data is written or erased on the mirror region of the header by controlling the optical disk, the optical disk system is not influenced (negatively affected) by the mirror region since it does not use data of the mirror region.

In FIG. 2, the laser diode optical output controlling apparatus according to the embodiment of the present invention further includes an optical output error compensator 14, a data processor 16, a microprocessor 18 and a mirror sensing logic circuit 20, as elements which are in addition to those shown in the conventional laser diode optical output controlling apparatus of FIG. 1. The optical output error compensator 14 is connected between the register controller 2 and the D/A converter 4 and includes an up/down counter and a register therein. The data processor 16, microprocessor 18 and mirror sensing logic circuit 20 supply signals for writing or erasing data during the mirror region interval of the header to the optical output error compensator 14. The optical output error compensator 14 compares an optical output value previously stored in the register with an actual output value and compensates an optical output value corresponding to the difference therebetween, during the mirror region interval of the header. The optical output value previously stored in the register is a present writing or erasing optical value. The optical output error compensator 14 compares the optical output value previously stored in the register with the output of the I/V converter 12, that is, the output voltage value from the I/V converter 12 which converts the present output current value of the photo diode 10 into a voltage value and compensates for an error and supplies the error-compensated result to the laser diode 8 via the D/A converter 4 and the current driver 6.

Referring to FIGS. 3A through 3C, respectively, a write mode signal WRMODE, a groove and land signal G/L and a mirror signal MIRROR are supplied from the data processor 16 to the mirror sensing logic circuit 20. The mirror signal MIRROR is generated when the mirror region within the header of the optical disk is detected. FIGS. 3H and 3I, respectively, show a write gate signal EG and an erase gate signal EG which designate signals applied from the microprocessor 18 to the mirror sensing logic circuit 20. The write gate signal WG is a signal for setting a writ able interval, and the erase gate signal EG is a signal for setting an erasable interval.

FIGS. 3D and 3F, respectively, show signals WR_DT and ER_DT which are obtained by frequency-dividing the mirror signal MIRROR generated from the data processor 16 by two, and which show writing and erasing mirror region detecting signals, respectively. The signals WR_DT and ER_DT are alternatively generated as shown in FIGS. 3D and 3F, respectively. FIGS. 3E and 3G respectively show a write enable signal WRENB and an erase enable signal ERENB which are signals supplied from the mirror sensing logic circuit 20 to the optical output error compensator 14.

An operation of the laser diode optical output controlling apparatus according to the embodiment of the present invention will now be described with reference to FIGS. 2 through 3I.

While the laser diode 8 continues to write and erase data to/from the optical disk, the optical output of the laser diode 8 is correctly controlled using the mirror region of the header. As indicated in FIG. 3C, the mirror signal MIRROR is generated whenever the mirror region of the header of the optical disk is detected. The mirror signal generated from the data processor 16 and the track jump interval (the write gate signal EG and the erase gate signal WG are at logic "low") are logically processed in the mirror sensing logic circuit 20 and the mirror signal becomes void in the track jump interval. The write gate signal EG and the erase gate signal EG are enabled after a lapse of a predetermined amount of time in a write mode state. This is because valid data may be damaged or unintentionally altered if data is written and erased before and after the track jump or during the track jump interval.

The data processor 16 supplies the write mode signal WRMODE, groove and land signal G/L and mirror signal MIRROR to the mirror sensing logic circuit 20. The microprocessor 18 supplies the write gate signal EG and the erase gate signal WG to the mirror sensing logic circuit 20. The mirror sensing logic circuit 20 frequency-divides the mirror signal MIRROR by two after the write mode signal WRMODE is set to logic "HIGH," and in more detail, from a groove interval (the groove and land signal G/L is at logic "HIGH") of the write mode state. In more detail, the mirror sensing logic circuit 20 frequency-divides the mirror signal MIRROR from the second pulse thereof within the groove interval by two. A signal frequency-divided by two from the second pulse of the mirror signal MIRROR is the writing mirror region detecting signal WR_DT. A signal frequency-divided by two from the third pulse of the mirror signal MIRROR is the erasing mirror region detecting signal ER_DT. Thus, the signals WR_DT and ER_DT are alternately generated. The pulse interval of each of the signals WR_DT and ER_DT is 1 μs, for example. The mirror sensing logic circuit 20 detects whether the WR_DT signal is at logic "LOW" as the WG signal from the microprocessor 18 becomes logic "HIGH," and outputs the WRENB (GROOVE) signal of logic "HIGH" after the WR_DT signal becomes logic "LOW" as illustrated in FIGS. 3D, 3E and 3H. The write enable signal WRENB (GROOVE) falls behind the signal WR_DT by about 200 ns. While the erasing mirror region detecting signal ER_DT is at logic "LOW," the mirror sensing logic circuit 20 supplies the erase enable signal ERENB (GROOVE) to the optical output error compensator 14 based upon logic "HIGH" of the erase gate signal EG. The erase enable signal WRENB (GROOVE) is delayed from the signal ER_DT by about 200 ns.

During intervals of the write and erase enable signals WRENB (GROOVE) and ERENB (GROOVE), that is, during the mirror region interval of the header, the optical output error compensator 14 compares the optical output value previously stored in the register during the mirror region interval of the header with the actual optical output value received from the I/V converter 12. If there is a difference between optical output values, the optical output error compensator 14 compensates for an error by using the internal up/down counter. The compensated writing or erasing optical digital value is temporarily stored in the internal register and supplied to the current driver 6 through the D/A converter 4. The current driver 6 drives the laser diode 8 by use of the compensated current value. Since the laser diode 8 generates the laser beam by the compensated current value, the constant optical output can be maintained without a variation in the optical output caused by heat. Therefore, accurate data is written in the disk and/or proper erasure of data is performed.

In FIGS. 3A through 3I, although the waveforms show the signals of the optical output for writing and erasing data at the groove interval (the groove and land signal G/L signal is at logic "HIGH"), signals at a land interval (the groove and land signal G/L signal is at logic "LOW") are identically applied.

As described previously, the optical output of the laser diode changed by heat generated by itself is continuously controlled by using the mirror region of the header defined on the optical disk. Therefore, the constant optical output is maintained and the accurate data is written in the optical disk and/or proper erasure of data is performed.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A method of controlling an optical output of a laser diode in an optical disk system for use with an optical disk having a header, comprising the steps of:
    controlling said laser diode to generate a writing or erasing optical output during a mirror region interval of the header within the optical disk, under a continuous optical output state of said laser diode; and
    compensating for a change in the optical output of said laser diode by comparing said writing or erasing optical output with corresponding preset writing and erasing optical output values.

2. The method as claimed in claim 1, wherein intervals for generating said writing or erasing optical output are each about 1 $\mu$s.

3. The method as claimed in claim 1, wherein a start point of each of intervals for generating said writing or erasing optical output falls behind a start point of said mirror region interval by a few hundred nanoseconds.

4. The method as claimed in claim 1, wherein intervals for generating said writing and erasing optical outputs are frequency-divided intervals of a plurality of said mirror region interval and are alternately generated.

5. The method as claimed in claim 1, wherein said step of controlling said laser diode comprises the steps of:
    generating a mirror signal in response to detection of a plurality of mirror regions of the header of the optical disk;
    generating a write enable signal and an erase enable signal in response to the mirror signal; and
    performing said step of compensating for the change in response to the write and erase enable signal and only during the mirror region intervals within the header.

6. The method as claimed in claim 5, further comprising the steps of:
    generating a write mode signal and a groove and land (G/L) mode signal; and
    enabling a write gate signal and an erase gate signal after a predetermined time in a write mode state of the optical disk system;
    wherein said step of generating a write enable signal comprises the steps of:
        frequency dividing the mirror signal by an integer number in response to enablement of the write mode signal and the G/L mode signal, to generate a writing mirror region detecting signal and an erasing mirror region detecting signal which are alternately generated, and
        generating the write enable signal in response to the writing mirror region detecting signal and the erase enable signal in response to the erasing mirror region detecting signal.

7. The method as claimed in claim 6, wherein the write enable signal is delayed from the writing mirror region detecting signal and the erase enable signal is delayed from the erase mirror region detecting signal, each delay being about 200 ns.

8. The method as claimed in claim 6, wherein a pulse interval of each of the writing mirror region detecting signal and the erasing mirror region detecting signal is approximately 1 $\mu$s.

9. The method as claimed in claim 7, wherein a pulse interval of each of the writing mirror region detecting signal and the erasing mirror region detecting signal is approximately 1 $\mu$s.

10. The method as claimed in claim 5, wherein the mirror signal is not generated at a track jump interval of the optical disk system.

11. A method of controlling an optical output of a laser diode in an optical disk system for an optical disk, comprising the steps of:
    repeatedly checking the optical output of the laser diode during a continuous operation of the laser diode; and
    maintaining the optical output of the laser diode at a constant intensity based upon the repeated checking thereof.

12. The method as claimed in claim 11, wherein the optical disk has a header having a mirror region and said steps of repeatedly checking and maintaining the optical output of the laser diode are performed during a mirror region interval of the mirror region of the header.

13. The method as claimed in claim 12, further comprising the steps of:
    storing previous writing and erasing optical outputs of the laser diode;
    generating current writing and erasing optical outputs of the laser diode;
    comparing the current writing and erasing optical outputs with the previous writing and erasing outputs, respectively, to generate comparison results; and
    adjusting a current to the laser diode based upon the comparison results, to maintain the intensity of the laser diode.

14. A method of controlling an optical output of a laser diode in an optical disk system for an optical disk having a header with a mirror region, comprising the steps of:
    supplying a current to the laser diode to generate an optical output; and
    controlling the optical output of the laser diode using the mirror region of the header of the optical disk, by adjusting the current to the laser diode in accordance with previous and current optical outputs.

15. A method of controlling an optical output of a laser diode in an optical disk system for an optical disk having a header with a mirror region, comprising the steps of:

supplying a current to the laser diode to generate an optical output; and controlling the optical output of the laser diode using the mirror region of the header of the optical disk, by adjusting the current to the laser diode, wherein:

the optical output includes a writing or erasing optical output; and said step of controlling the optical output comprises the steps of storing a previous writing or erasing optical output of the laser diode, and comparing the previous writing and erasing optical output with a current writing or erasing output, to generate a comparison result, and adjusting the current supplied to the laser diode based upon the comparison result.

16. A method of controlling an optical output of a laser diode in an optical disk system for an optical disk having a header with a mirror region, comprising the steps of:

supplying a current to the laser diode to generate an optical output; and comparing a previous optical output of the laser diode with the optical output of the laser diode; and adjusting the current to maintain an intensity of the laser diode constant based upon the comparing step;

wherein said steps of supplying a current, comparing a previous optical output and adjusting the current are performed during only a mirror region interval of the mirror region of the header of the optical disk.

17. An apparatus for controlling an optical output of a laser diode in an optical disk system for use with an optical disk having a header, comprising:

a circuit to generate a writing or erasing mirror region interval detecting signal during a mirror region interval within the header on the optical disk using signals designating a mirror region of the header defined in plural quantities on the optical disk and a plurality of control signals, under a continuous optical output state of the laser diode; and an optical output error compensator having a register to store a previous optical output valve of the laser diode and to compensate for a change in the optical output valve of the laser diode by comparing the optical output valve previously stored in the register during the mirror region interval of the header according to said writing or erasing mirror region interval detecting signal with the optical output valve of the laser diode.

18. The apparatus as claimed in claim 17, wherein said optical output error compensator comprises up/down counter to adjust the previous output value of the laser diode stored in the register to adjust the an optical output value of the laser diode.

19. An apparatus to control an optical output of a laser diode in an optical disk system for use with an optical disk having a mirror region in a header, comprising:

a timing control unit to generate a mirror region interval detecting signal during a mirror region interval within the header based upon detection of the mirror region; and an optical output error compensator to adjust the optical output of the laser diode during only the mirror region interval, based upon the mirror region interval detecting signal.

20. The apparatus as claimed in claim 19, wherein:

said timing control unit comprises:

a first processor to generate a mirror signal in response to the detection of a plurality of the mirror regions of the header of the optical disk, and a mirror sensing logic circuit to generate a write enable signal and an erase enable signal in response to the mirror signal, and said optical output error compensator adjusting a current to the laser diode in response to the write and erase enable signal.

21. The apparatus as claimed in claim 20, further comprising:

a second processor to enable a write gate signal and an erase gate signal after a predetermined time in a write mode state of the optical disk system;

wherein said first processor generates a write mode signal and a groove and land (G/L) mode signal, and said mirror sensing logic circuit frequency divides the mirror signal by an integer number in response to enablement of the write mode signal and the G/L mode signal, to generate a writing mirror region detecting signal and an erasing mirror region detecting signal which are alternately generated, thereby generating the write enable signal and the erase enable signal.

22. The apparatus as claimed in claim 21, wherein the write enable signal is delayed from said writing mirror region detecting signal and the write enable signal is delayed from said writing mirror region detecting signal, each delay being about 200 ns.

23. The apparatus as claimed in claim 22, wherein a pulse interval of each of the writing mirror region detecting signal and the erasing mirror region detecting signal is approximately 1 µs.

24. The apparatus as claimed in claim 19, further comprising:

a register controller having registers to store digital values for recording data onto the optical disk;

said optical output error compensator selecting one of the digital values;

a current controller to supply a current to the laser diode in response to the selected digital value; and a photodetector to detect an intensity of the optical output of the laser diode;

wherein said optical output error compensator compares the selected digital value to a value corresponding to the detected intensity of the optical output and adjusts the digital value, the comparison and adjustment of the digital value occurring during the mirror region interval.

* * * * *